April 9, 1957 A. E. TOHT 2,788,215
STYLUS ARM AND MOUNTING
Filed Sept. 11, 1951 2 Sheets-Sheet 1
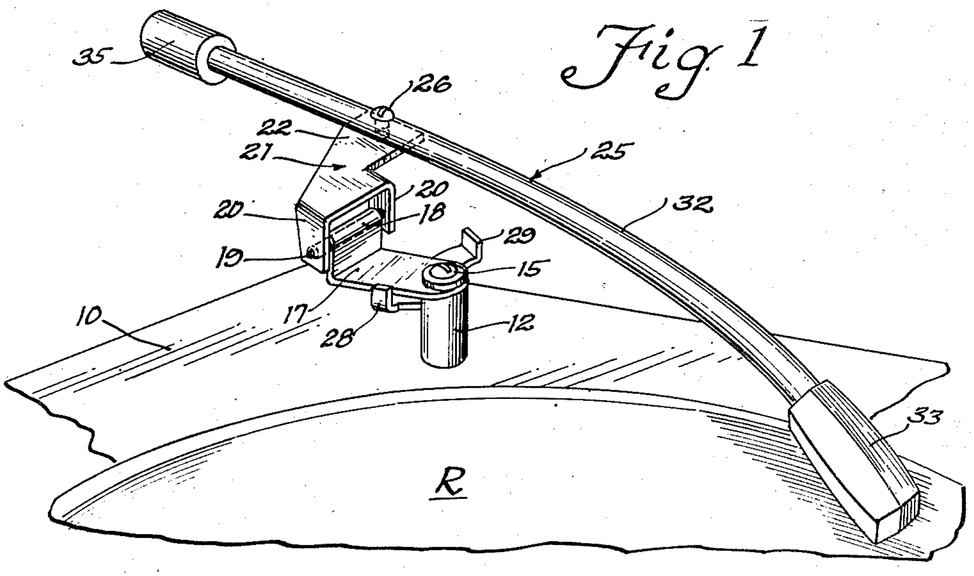
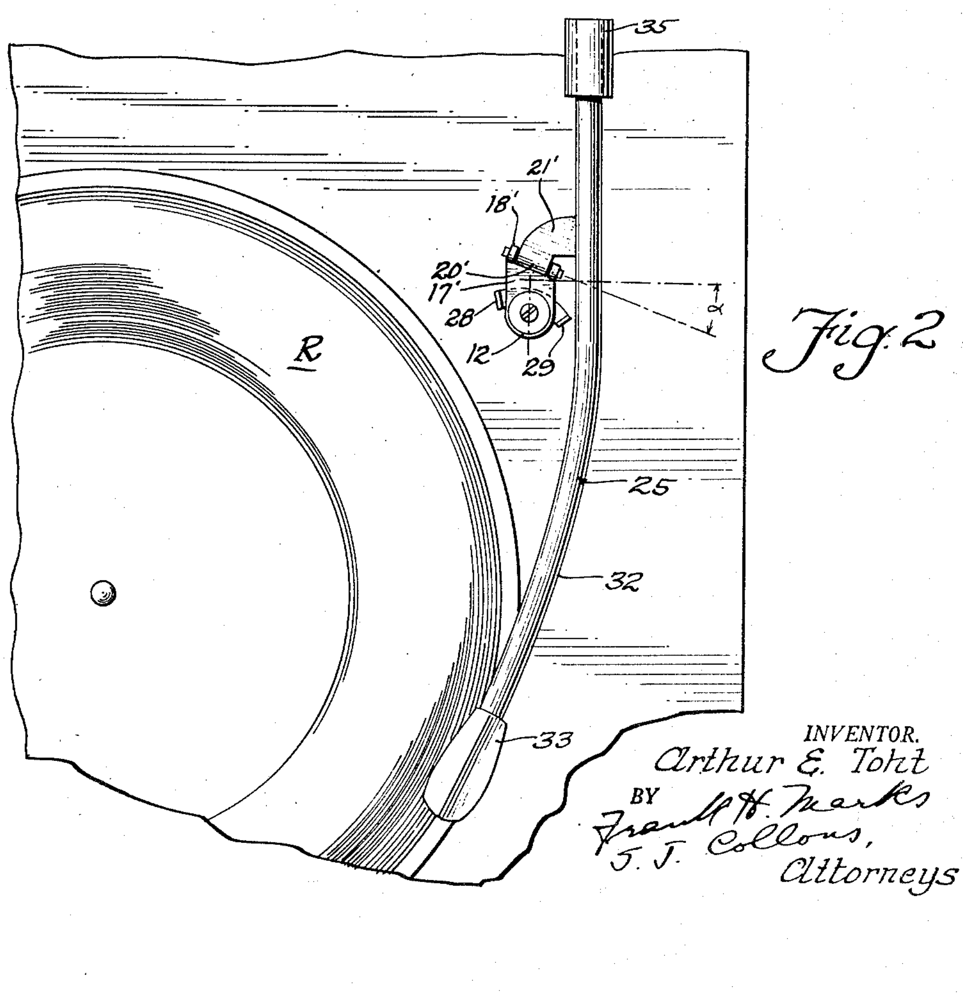
Fig. 2
INVENTOR.
Arthur E. Toht
BY Frank H. Marks
S. J. Collons,
Attorneys INVENTOR.
Arthur E. Toht
BY Frank H. Marks,
S. J. Collons,
Attorneys

United States Patent Office 2,788,215

Patented Apr. 9, 1957

2,788,215

STYLUS ARM AND MOUNTING

Arthur E. Toht, Wheaton, Ill., assignor to Sears, Roebuck and Co., Chicago, Ill., a corporation of New York Application September 11, 1951, Serial No. 246,057

4 Claims. (Cl. 274—23)

My invention relates primarily to stylus carrying arms, such as tone arms for phonographs, and has to do more particularly with a tone arm and support therefor which will accomplish a number of highly desirable objectives.

My invention, in its broad aspects, is not restricted to phonograph mechanisms but has a wide application to a field which also includes sound recording mechanisms, devices for visual recording, as with the use of an ink stylus, etc. My invention will be described with particularity in connection with a phonograph playing arm, but it will be understood that my invention is equally applicable to other types of devices, such as those indicated above.

A primary objective of my invention is to produce a tone arm which will satisfactorily play a sound record of the grooved disk type with a minimum of needle force, which force can be determined and altered by the construction and adjustment of the device to a value as low as desired.

Furthermore, in accordance with my invention, I produce an arm which is balanced in all directions about its rotational pivot (i. e., its axis perpendicular to the sound record) so that it will freely track any record without excess wear on either the needle or the record.

Another important advantage is that devices made in accordance with my invention will operate satisfactorily in accordance with the aforesaid conditions, not only with the record (or other) surface in a horizontal playing position but also in various other positions up to an angle of 90 degrees to the horizontal.

Many advantages accrue to devices which accomplish the aforesaid objectives. Thus, lowered needle pressure and lowered driving force contribute markedly to reduction of needle wear and record wear. In the playing of so-called "long-playing" records with narrow and closely spaced grooves, devices embodying my invention avoid the tendency found in other mechanisms to tear out the side of a groove or to skid laterally across one or more grooves, with resultant shock and wear both to needle and record.

The ability to play records in a vertical playing position results in saving of space, which can be advantageous in either a portable or cabinet type of phonograph, making possible by space economy the use of larger and improved speakers without increasing the size of the case. The ability of my improved mechanism to operate at various angles also renders it available for mobile units, as in boats, airplanes, etc., whereas presently known devices are not entirely successful for use because of their inability to stand without shock changes in the operating angle.

I am able to accomplish the above mentioned objectives and the resultant advantages by producing a stylus arm and mounting therefor, which meets certain physical conditions. The arm is pivotally mounted on a plate on an axis parallel to the record plane to permit its inclination toward and away from the record at the needle end of the arm, said axis being rotatable about an axis perpendicular to the record plane, which I call the basic pivot. The arm is so mounted that its center of gravity, except for the needle force, is centered directly above the basic pivot in every direction in which the needle may be operating. As a result of the aforesaid conditions, there is assured an absolute balance of the tone arm, except for the desired needle force, about said basic pivot when the arm is in operating position, and it will rest in any playing position in which it is set and will follow a record groove freely, regardless of the angle to the horizontal which the basic pivot may make, within the approximate range of 0° to 90°, generally speaking.

My invention will be best understood by consideration of the appended drawings forming a part of this specification and illustrating preferred embodiments of my invention, wherein:

Fig. 1 is a top perspective view of a tone arm embodying my invention in playing relation with a record, the latter and part of the cabinet being shown fragmentarily;

Fig. 2 is a top plan view of a modified form of the same;

Figure 3:
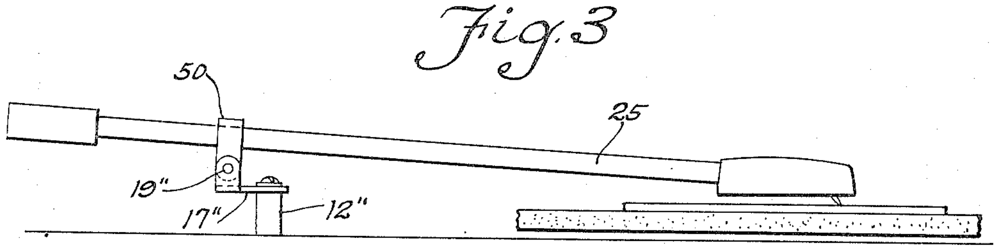
Fig. 3 is a side elevational view of another modification of tone arm and support in relation to a record and turntable.

Numeral 10 represents any suitable support for the tone arm mounting means and may be a panel of a phonograph cabinet, either console, portable or other suitable type. While the support 10 happens to be shown in a horizontal position, it should be clearly understood that, in accordance with my invention, said support may be horizontal or vertical or any position between these extremes, as will hereinafter appear.

Secured to the panel 10 by any suitable means is a post 12 which will be preferred to hereinafter as defining the basic pivot. Pivotally mounted on post 12 and retained by suitable means, such as a machine screw 15, is a plate 17 which projects laterally from said post, normally in a parallel plane to and in a direction away from the turntable and record R, plate 17 being freely rotatable on post 12.

Plate 17 has formed on the end thereof opposite post 12 a sleeve 18 which serves as a hinge part receiving a pintle 19, the latter in turn being journalled in suitable apertures formed in ears 20, 20 depending from a bracket 21. The bracket 21 has a lateral offset 22 to which is secured a tone arm 25 by any suitable means, such as a screw 26.

The axis of the hinge formed by the cooperating parts 18, 19 and 21 is in a plane parallel to the turntable and face of record R and is preferably at an angle displaced from the perpendicular to the major axis of plate 17. This angle, which is indicated in Fig. 2 as $\alpha$, I find preferably lies within the range of 15°–20° to the perpendicular to said plate axis.

Stop members 28 and 29, which may be in the form of rectangular plates, as seen in Figs. 1 and 2, are secured to post 12 for limiting the swing of hinge plate 17 and, therefore, of the tone arm 25, within the range required by the area of the record groove.

The tone arm 25 is of any suitable design, although I have found most satisfactory a tubular member 32 as having the best acoustical properties, being most lacking in resonance. The arm 25 carries a stylus supporting head 33 and is properly counterbalanced as at 35, said counterbalance being adjusted so that the stylus will exert a desired needle force to record R. Furthermore, in accordance with the best practice and theory, member 32 is preferably curved toward the head end so that the needle will track approximately tangentially to the record groove.

In mounting the tone arm 25 the point of attachment of member 32 to hinge plate 21 is so selected that the center of gravity of the arm will be substantially over and in line with post 12. The angle of the hinge axis defined by elements 18—20 is also selected with this end in view. As stated before, this angle has been found to lie within the range of 15 to 20° to the perpendicular of the radius vector of post 12, which I call the basic pivot, in the forms shown in Figs. 1 and 2. Said condition, however, need not apply under all circumstances.

Plates 17 and 21, as shown in Fig. 1, may conveniently and economically be formed as stampings, although they may, if desired, be cast or otherwise produced.

In the embodiment shown in Fig. 1 the hinge defined by pintle 19 is above the upper extremity of the basic pivot represented by post 12 and below the tone arm center of mass in the horizontal position shown in Fig. 1. This hinge is offset from the stylus end of the arm sufficiently to create a relatively slight unbalance sufficient to result in rotation of the arm about the axis represented by pintle 19 to provide the desired needle force against the record within a wide range of positions, as hereinafter more fully described.

Referring to Fig. 2, the tone arm shown there is substantially identical with the one shown in Fig. 1 and the mounting, therefore, is substantially the same in basic principles. The post 12, representing the basic pivot, supports a plate 17′ which is substantially similar to plate 17, lying parallel to the turntable and record and being deformed at its end away from the record, as at 18′, to interengage pivotally with plate 21′ which is secured as by soldering to the arm 25. The plate 21′ is deformed to provide a hinge portion 20′ interengaging with the hinge portion 18′ of plate 17′.

The tone arm is balanced about the basic pivot and hinge in a manner substantially identical with the arrangement shown in Fig. 1.

The mechanism described above thus results in two non-intersecting axes of rotation in planes perpendicular to each other. The hinge is arranged to permit limited rotation about a normally horizontal axis sufficient merely to permit the stylus to engage and clear the record playing surface.

In operation, the needle end of the tone arm is raised from a place of rest and disposed in engagement with the record in a manner similar to hitherto known types of tone arms, and disengaged from the record in a conventional manner.

By virtue of the balanced construction, the needle force may be adjusted to any desired value, say 5 grams or less. Such adjustment of the needle force is accomplished by spacing the hinge 19 closer to or farther away from the basic pivot and counterbalancing at the end of the arm, depending on whether it is desired to reduce or increase the force. The balance about the basic pivot permits the arm to float freely about said pivot as the needle tracks the record groove practically without resistance, within moderate limits. Thus, when the basic pivot is vertical, the action is similar to that of a conventional tone arm, except for reduced needle force and lower lateral driving force permitted by my improved construction.

Figure 4:
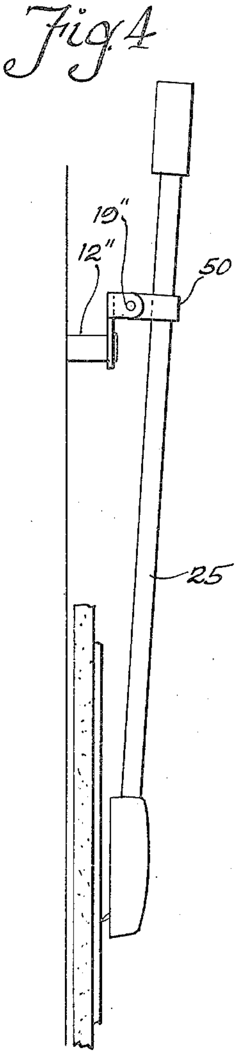
Fig. 4 is a view similar to Fig. 3 but showing the parts with the turntable arranged in a vertical plane and the tone arm supported from a point above the turntable.
Figure 5:
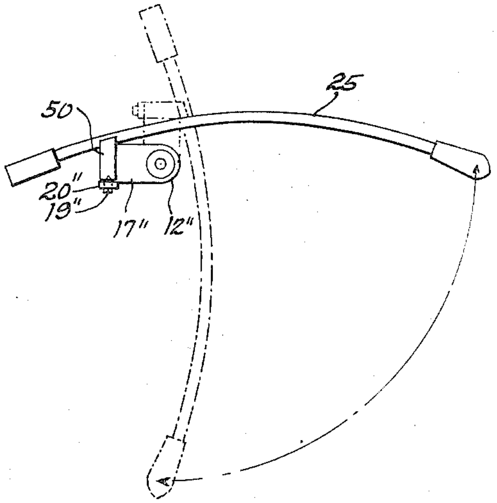
Fig. 5 is a front elevational view taken from a position at right angles to that of Fig. 4, and Figs. 6, 7 and 8 are elevational views on a reduced scale similar to Fig. 5 but showing the range of operation of the tone arm when he parts are rotated through 90° in a vertical plane.

Figs. 3–5 illustrate another embodiment of my invention which is somewhat simplified as compared with embodiments of Figs. 1 and 2, although employing substantially the same basic principles. In this embodiment post 12″ functions as the basic pivot as before, being perpendicular to the plane of the turntable and record and carrying at its upper end a hinge plate 17″. Hinge plate 17″ is deformed at its end away from the pivot 12″ to provide hinge ears 20″ engaging a pintle 19″ to which is secured a second hinge member 50, the latter being rigidly attached as by soldering to tone arm 25 which is substantially similar to the tone arm previously described.

In the embodiment just described, the tone arm is dynamically balanced with regard to the basic pivot 12″ and the hinge axis 19″ as in the other embodiments, i. e., with the tone arm substantially balanced about the hinge pintle 19″ and the basic pivot 12″ so that its center of gravity is again over the basic pivot 12″ and so that the resultant of the moments about the basic pivot will be only slightly in excess over a perfect balance in the application of needle force of any desired value to the record in any of the positions which will hereinafter be described.

Figures 6, 7, 8:
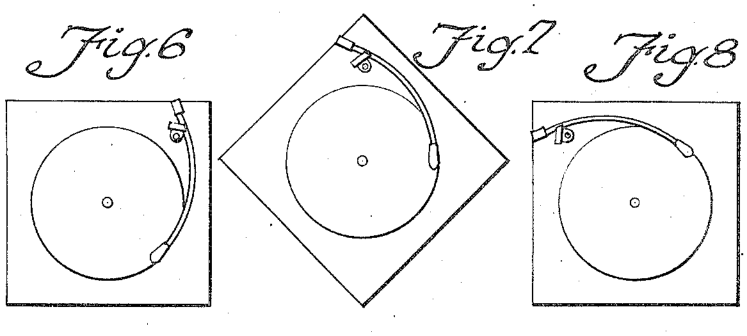

Devices as shown in the embodiments heretofore described will operate satisfactorily with the turntable lying in a horizontal plane, a vertical plane or in any intermediate position within that 90° angle. Furthermore, in the vertical plane the tone arm is so dynamically balanced that the desired needle pressure will be applied to maintain satisfactory tracking within the 90° range for the arm shown diagrammatically in Figs. 6, 7 and 8.

Assuming that the entire phonograph is rotated from the horizontal position of the turntable to the vertical, say to the position of Figs. 4–8, as the basic pivot changes the direction of its axis from the vertical toward the horizontal in any direction, the tone arm is perfectly balanced about said basic pivot at all times, and therefore, holds its position with the needle in operating position on the record, unless deliberately moved away therefrom, and when manually so removed and released, the tone arm will automatically revert to the normal playing position with the needle in engagement with the record face.

It might be expected that when the record, turntable and associated parts are moved angularly as a unit toward the vertical, the needle force would rapidly decrease and that the tone arm would fall away from the record face at or near the vertical position of the latter. However, due to the novel construction herein described, such does not occur. On the contrary, a substantially uniform needle force is maintained toward the record in any position of the latter from horizontal up to and including the vertical, except for certain limitations hereinafter mentioned.

This surprising effect is due to the resultant effect of the various components of force acting in my construction.

Due to the substantial balance of the tone arm about the basic pivot and to the fact that the hinge members are a rigid part of the arm with respect to its rotation about the basic pivot, a change in the angle of the basic pivot within the range from vertical to horizontal in no way changes the location of the tone arm relative to the record or its lack of tendency to exert a skidding force at the stylus parallel to the record face, even though an absolutely smooth surface were substituted for the record.

This last mentioned characteristic is of prime importance not only in connection with phonograph players and recorders, but also in connection with recording devices wherein an ink stylus is employed on the arm for application of a graph to a sheet of paper or the like.

As the stylus arm tilts with respect to the normal horizontal position, regardless of direction, the needle force, due to the slight unbalance about its hinge, is changed from a direct downward force to a component dependent on the angle and direction of the change. This is due to the tendency of the tone arm to rotate about the hinge necessitated by its center of mass being located outside the hinge axis. The resultant of all forces acts in rotation of the tone arm toward application of the needle to the face of the record in all positions of the record within the range between the horizontal and the vertical planes.

As an incident to the design of my improved tone arm, the resultant needle force remains substantially constant as the record plane is rotated between the horizontal and the vertical positions, regardless of the angle or direction of rotation. With attention given to the location of the basic pivot as related to the turntable axis, the arm will function in the manner described above.

Various changes coming within the spirit of my invention may suggest themselves to those skilled in the art. Hence, I do not wish to be limited to the specific embodiments described or uses mentioned, but intend the same to be mere exemplary, the scope of my invention being limited only by the appended claims.

I claim:

1. In combination with a platform and a stylus arm, said stylus arm having a stylus at one end thereof and a counterweight near the opposite end thereof, means mounting said arm on the platform comprising a post extending from said platform, a link extending in a direction substantially parallel to the longitudinal axis of that portion of the stylus arm adjacent to said link and having one part thereof pivotally connected to said post to form a main pivotal joint therewith in a plane substantially parallel to said platform, an auxiliary pivot on said link remote from said main pivotal joint and between the plane of the latter and said stylus arm, said auxiliary pivot being disposed at an acute angle relative to a line normal to the longitudinal axis of said link and substantially parallel to the platform, said stylus arm having its center of gravity disposed substantially at said main pivotal joint and having a part thereof slightly beyond said center of gravity and on the side thereof opposite to the stylus connected to said auxiliary pivot, said stylus arm being substantially balanced about said auxiliary pivot except for a relatively slight moment of force normally urging the stylus toward the platform in the horizontal position of said platform, and said stylus arm being similarly balanced about said auxiliary pivot in the vertical position of said platform and in all positions thereof intermediate the horizontal and vertical positions, said balancing of said stylus arm being attained by gravitational effects exclusively.

2. An apparatus as set forth in claim 1 wherein the angular disposition of the auxiliary pivot relative to the line normal to the axis of said link is on the order of 15° to 20°.

3. In combination with a platform and a turntable mounted thereon, a stylus arm having a stylus at one end thereof and a counterweight at the opposite end thereof, means mounting said arm on the platform comprising a post perpendicular to the platform, a link extending in a direction substantially parallel to the longitudinal axis of that portion of the stylus arm adjacent to said link and having one part thereof pivotally connected to said post to form a main pivotal joint therewith in a plane substantially parallel to said platform, an auxiliary pivot on said link remote from said main pivotal joint and between the plane of the latter and said stylus arm, said auxiliary pivot being disposed at an acute angle up to 20° relative to a line normal to the longitudinal axis of said link and substantially parallel to the platform, said stylus arm having its center of gravity substantially overlying said main pivotal joint and having a part thereof slightly beyond said center of gravity and nearer to said counterweight connected to said auxiliary pivot, said stylus arm being substantially balanced about said auxiliary pivot except for a relatively slight moment of force normally urging the stylus toward the turntable in the horizontal position of said platform and said stylus being similarly balanced about said auxiliary pivot in the vertical position of said platform and in all positions thereof intermediate the horizontal and vertical positions, the balancing of said stylus arm being attained by said counterweight only to the exclusion of any springs.

4. In combination with a platform and turntable mounted thereon, a stylus arm having a stylus at one end thereof and a counterweight near the opposite end thereof, means mounting said arm on the platform comprising a post extending from said platform, a link extending in a direction substantially parallel to the longitudinal axis of that portion of the stylus arm adjacent to said link and having one part thereof pivotally connected to said post to form a main pivotal joint therewith in a plane substantially parallel to said platform, an auxiliary pivot on said link remote from said main pivotal joint and between the plane of the latter and said stylus arm, said auxiliary pivot being disposed at an acute angle relative to a line normal to the longitudinal axis of said link and substantially parallel to the platform, said stylus arm having its center of gravity disposed substantially at said main pivotal joint and having a part thereof slightly beyond said center of gravity and remote from the stylus connected to said auxiliary pivot, said stylus arm being substantially balanced about said auxiliary pivot except for a relatively slight stylus pressure on said turntable in the horizontal position of said platform and said stylus arm being similarly balanced about said auxiliary pivot in the vertical position of said platform and in all positions thereof intermediate the horizontal and vertical positions, said balancing of said stylus arm being attained by gravitation effects exclusively and said disposition of said center of gravity of said stylus arm relative to said main pivotal joint and auxiliary pivot resulting in a substantially balanced mounting of said stylus arm in various positions of the platform within a range of approximately 90° of rotation thereof in a vertical plane from a position wherein the stylus arm depends substantially vertically from said main pivotal joint to a position wherein it extends laterally therefrom above the turntable axis, the stylus arm maintaining tracking relation to said turntable through said range of positions by reason of said balance.

References Cited in the file of this patent

UNITED STATES PATENTS

| | | |
|---|---|---|
| 1,895,126 | Hilgenberg | Jan. 24, 1933 |
| 1,930,544 | Victor | Oct. 17, 1933 |
| 2,271,039 | Slade et al. | Jan. 27, 1942 |
| 2,380,037 | Franck et al. | July 10, 1945 |
| 2,434,033 | Cain | Jan. 6, 1948 |
| 2,489,146 | Louchheim | Nov. 22, 1949 |

FOREIGN PATENTS

| | | |
|---|---|---|
| 534,741 | Great Britain | Mar. 17, 1941 |